US007792898B2

(12) United States Patent
Lu et al.

(10) Patent No.: US 7,792,898 B2
(45) Date of Patent: Sep. 7, 2010

(54) METHOD OF REMOTE DISPLAYING AND PROCESSING BASED ON SERVER/CLIENT ARCHITECTURE

(75) Inventors: Ruxi Lu, Guangzhou (CN); Yuanxiong Pan, Guangzhou (CN); Paul White, Guangzhou (CN)

(73) Assignee: Vtron Technologies Ltd., Guangdong (CN)

( * ) Notice: Subject to any disclaimer, the term of this patent is extended or adjusted under 35 U.S.C. 154(b) by 165 days.

(21) Appl. No.: 11/913,016

(22) PCT Filed: Oct. 19, 2005

(86) PCT No.: PCT/CN2005/001716

§ 371 (c)(1),
(2), (4) Date: Apr. 4, 2008

(87) PCT Pub. No.: WO2006/116903

PCT Pub. Date: Nov. 9, 2006

(65) Prior Publication Data

US 2008/0215671 A1  Sep. 4, 2008

(30) Foreign Application Priority Data

Apr. 30, 2005  (CN)  ................ 2005 1 0034435

(51) Int. Cl.
    *G06F 15/16* (2006.01)
(52) U.S. Cl. .............. 709/203; 709/247; 345/544; 715/272; 715/273; 715/275; 715/723
(58) Field of Classification Search ................ 709/203, 709/247; 345/544; 715/272, 273, 275, 723
See application file for complete search history.

(56) References Cited

U.S. PATENT DOCUMENTS

| 5,610,841 | A  | * | 3/1997  | Tanaka et al. | ............... 725/115 |
| 6,356,283 | B1 | * | 3/2002  | Guedalia | ..................... 715/760 |
| 7,068,279 | B2 | * | 6/2006  | Narita | ......................... 345/530 |
| 7,287,099 | B1 | * | 10/2007 | Powderly et al. | .............. 710/7 |
| 7,463,267 | B2 | * | 12/2008 | Wise et al. | ................... 345/540 |

FOREIGN PATENT DOCUMENTS

| WO | WO0197082 | 12/2001 |
| WO | WO2004070542 | 8/2004 |

* cited by examiner

*Primary Examiner*—William C Vaughn, Jr.
*Assistant Examiner*—Mohamed Ibrahim
(74) *Attorney, Agent, or Firm*—Seyfarth Shaw LLP

(57) ABSTRACT

A method of remote displaying and processing based on Server/Client architecture adopts a technical scheme of specific inter-frame increment compression and data comparison compression of the adjacent area-bits of the inner-frame within the side of Server, thus removing the intricate computation mode in the traditional inter-frame compression scheme, and reducing the resource usage of a computer; the side of the client adopts an increment refreshing mode to display an image, only refreshes the changed part, if the part was changed, then the part was refreshed; so that the refreshing speed of the remote desktop is improved highly, while the system resource usage of the computer is reduced highly.

5 Claims, 1 Drawing Sheet

METHOD OF REMOTE DISPLAYING AND PROCESSING BASED ON SERVER/CLIENT ARCHITECTURE

This application is a U.S. National Phase of International Patent Application. Serial No. PCT/CN2005/001716, filed Oct. 19, 2005 which claims priority to Chinese Patent Application No. 200510034435.9 filed Apr. 30, 2005.

BACKGROUND OF THE INVENTION

The present invention relates to a method for processing display of computer, and in particular to a method of remote displaying and processing based on Server/Client architecture.

Normally, the known remote display control technique adopts Server/Client architecture. The Server is mainly used for acquiring image signal, analyzing, compressing and transmitting the variation of the image signal. For the display control mainly relates to the computer image on the internet, lossless compression is normally used, and considering the bandwidth limit of internet, the main object is to improve the compression ratio. The known lossless compression mainly comprises the following types: run length encoding (RLE), huffman coding compression, dictionary compression, arithmetic compression, MPEG compression (lossy or lossless compression is available). The principle of run length encoding is that: adjacent pixels with the same color value in a row are replaced by an enumerated data and the color value. For example, aaabccccccddeee may be represented by 3a1b6c2d3e. If an image consists of a plurality of large area with the same color, the compression ratio of this method would be surprising. However, this method has a vital defect that if every two adjacent points have different color, data amount would become double instead. Huffman coding is usual compression coding method, the principle of which is that the frequently appearing data is replaced by shorter code, while the less appearing data is replaced by longer code, and each data is of different code length. The defect of huffman coding is that it is necessary to scan the original image data twice, construct a binary tree and traverse the binary tree to generate coding, thus the speed of data compression and recovery is relative low. The dictionary compression is similar to the haffman coding, and the principle is that repeated character strings in the original data are used to construct a character table, and then an index value of the repeated character string in the character table is used to replace the original data so as to achieve compression. The dictionary compression is of high coding efficiency, but low speed in decoding. The arithmetic compression is also similar to the haffman compression, the frequently appearing data in the image data is replaced by shorter coding, while the less appearing data is replaced by longer code, so as to achieve data compression. Meanwhile, the arithmetic compression adopts the concept of dictionary compression, which compresses the data value and the value list, this method could obtain a higher compression ratio, but the arithmetic is so complex that the speed of compression and the speed of decompression are greatly affected. MPEG compression is also a method designed to improve the data transmission in the environment of narrow bandwidth, the method includes the types of intraframe compression and interframe compression, the intraframe compression is based on DCT coding technique, while the interframe compression adopts the techniques including forecasting method, difference compensation method, motion compensation method and so on. The MPEG arithmetic is relative complex and very effective to transmission in narrow bandwidth, but occupies high CPU resource and consumes the system resources seriously.

With the great improvement of transmission bandwidth, especially the transmission speed in LAN has reached the level of Giga Byte, it is unnecessary to pay more attention to compression ratio, and under such a condition, a new way for remote control displaying and processing which allows the remote control display window to display at nearly a real-time speed.

SUMMARY OF THE INVENTION

It is an object for the present invention to provide a method of remote displaying and processing based on Server/Client architecture, which realizes quick display of desktop window of remote computer on the Client in the LAN, while the system resource usage is greatly reduced and computer speed become faster.

1. Current desktop signal is used as data source, and an original frame is extracted from the data source and saved;

2. An area in the memory of the Server computer is divided into three blocks, the first block is used for saving original image data, the second block is used for saving image data currently generated, and the third block is used for compressing the data to be transmitted after comparison, 3. Pixel data of the current frame and the previous frame is compared one to one from the second frame. If no data variation occurs, the data of the first block remains unchanged. If data variation occurs, the changed data replaces the data in the previous frame. Then, each two adjacent pixels are carried out data comparison within frame so as to finish the data acquisition and compression coding.

4. All the data transmitted to the third block in sequence is compressed, packaged and sent out. The data transmission between the Server and the Client adopts uninterrupted transmission (whether or not the data is transmitted, the Server and the Client remain on transmission state all along). The main function of the Client computer is decompression and display.

5. The Client receives the compression data from the Server, and then decompresses the compression data and transmits the decompression data to the computer memory. After receiving the decompression data, the computer only has to refresh the changed part, and the unchanged part does not need any action. The refreshing speed is very fast due to local refreshing, which ensures the image display property of computer.

The data acquisition and compression coding is as follow:

A. during the comparison, judgment values are added to judge if interframe variation occurs, if the data is black data or white data or non-black and non-white data, if the data is independent changed data, if it is a regular change between two colors; the coding compression is carried out according to the above judgment results;

B. During the comparison, length identifier is used for judging the number of continuous changed value between frames, the number of black or white data, the number of non-black and non-white data, and the number of the two regular colors.

In the data compression according to the present invention, the changed data judged to be independent may be optimized. If the above method is adopted, the data amount required to be updated is huge for a richly colorful image having distinct color variation. The present invention could further uses high bit comparison, i.e. if a data is different from the previous pixel and the next pixel, high bit comparison is firstly carried out between the data and the previous pixel one by one or several by several; if the high bits are identical, the high bit could be preset, i.e. the high bit is set to 1; as for the independent data with difference in several continuous high bits, additional judgment value and length identifier may be added in front of the independent data to represent the continuous independent data with different high bit.

In the data acquisition and compression according to the present invention, when variation of two colors is judged (i.e. there are only two colors of data in part or entire of the image), the color data is set to a byte so as to reduce the data amount desired to transmitted.

The Server of the present invention adopts intraframe compression and interframe compression. The intraframe compressor mainly compares the adjacent pixels within frame, which is very simple, and the DCT coding transform in MPEG arithmetic is unnecessary. The interframe compressor of the present invention adopts increment comparison, that is, the current frame is compared with the previous frame, and only the changed data is processed and compressed. This comparison compressor does not require forecasting coding, motion compensation and so on, which is simple and improves the compression speed greatly. The complex calculating method in traditional interframe compression is discarded, and the computer resource usage is reduced. The Client adopts increment refreshing so as to display the image, where only the changed part is refreshed, thus the refresh speed of remote desktop is greatly increased, and the computer resource usage is reduced.

Figure 1:
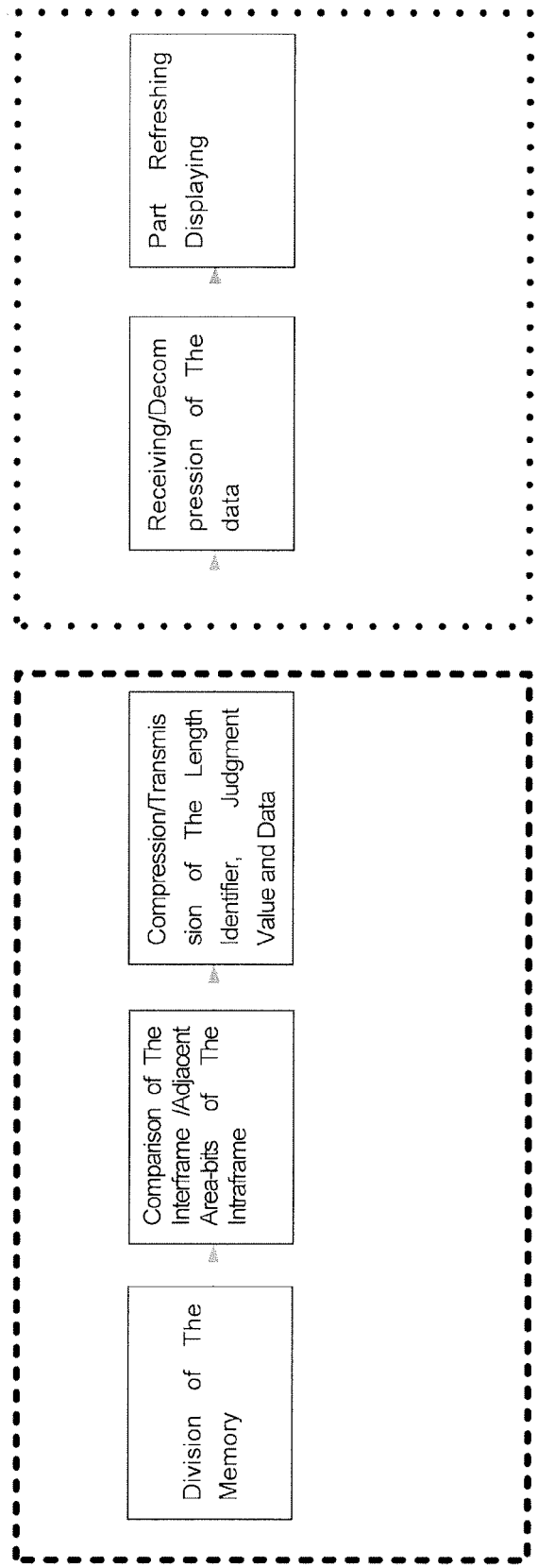
FIG. 1 is a diagram of the principle of the present invention.

DETAILED DESCRIPTION OF THE INVENTION 1. the desktop signal is 1024×768 (16 bit color, and an image is taken out to be used as original frame;

2. the display driver apply for an area in the memory in the system, the area may be a continuous area, the area is 6 mega bytes and divided into three blocks, a first block with 1.5 mega bytes is for saving the current frame data, a second block with 1.5 mega bytes is for saving the previous frame data, a third block with 4 mega bytes is for saving the data desired to transmit;

3. the pixels are compared one to one between the previous frame and the current frame and between adjacent pixels within the current frame, so as to finish data acquisition and compression coding;

4. the way of data compression coding is as follow: A) during the comparison, a judgment value is added to determine if interframe change occurs, if the data is black or white or non-black and non-white data, if the data is a independent changed data, and if the data is regular variation of two colors, and then the coding is carried out according to the above judgment results; when interframe change does not occur, the judgment value is set to 0; when the data is white, the judgment value is set to 1; when the data is black, the judgment value is set to 2; when the data is not black and white data, the judgment value is set to 4; when the data is an independent changed data, the judgment value is set to 8; when the data is regular variation of two colors, the judgment value is set to 3. B) During the comparison, length identifier is used for determine the number of continuous changed values between frames, the number of black or white data, the number of non-black and non-white data, the number of regular two colors; for instance, the detailed coding is as follow: (without considering color depth, the frame buffer is considered as original memory, the processing is carried out each time with the unit of Dword (4 bytes, two 16 bits)).

For each frame data, a screen is a block (1024×768), and coding is carried out from top left corner to bottom right corner.

The compression end and decompression end both save the previous frame image, and the new image is processed based on the previous image. For convenience, all the data is represented by hexadecimal. After coding, the data elides '0x'.

(1) judging the unchanged between frames, the coding of the same data between frames is:

(0?) 1 byte or (0? 5? ??) 3 bytes;

when 1 to 0x10 DWord data is the same as the comparative frame, the coding is 0?;

for instance, when 5 DWord data is the same as the comparative frame, the coding is represented by 04 (0 is judgment value, 4 is value of length identifier, the following is the same);

1 DWord data is the same as the comparative frame, the coding is represented by 00, and it should be noted that the number representing coding should subtract from 1, because it is meaningless that zero DWord is the same as the comparative frame.

When 0x11 to 0xffff DWord data is the same, the coding is represented by 0? 5? ??.

For instance, if 0x11 DWord data is the same, the coding is represented by 00 50 11; if 0xab4d DWord data is the same, the coding is represented by 0a 5b 4d.

The above 0x5? is a way of scalable coding, and when only 0x11 to 0x10000 DWord data is required to be carried out the same coding, this scalable coding is used, and the extending way is the same. When extending, the counted number does not subtract from 1.

(2) when the data is white, the coding of 0x00000000 is:

(1?) 1 byte or (1? 5? ??) 3 bytes

For instance, five "0x00000000" is represented by 14;

One "0x00000000" is represented by 10; the extending method is the same as the above.

(3) when the data is black, the coding of 0xffffffff is:

(2?) 1 byte or (2? 5? ??) 3 bytes

For instance, five "0xffffffff" is represented by 24; one "0xffffffff" is represented by 20; the extending method is the same as the above.

(4) when the data is non-black and non-white, the color is represented by (4? zz zz zz zz) 5 bytes or (4? zz zz zz zz 5? ??) 7 bytes; wherein zz zz zz zz is the original data;

when there are 1 to 0x10 number of "zz zz zz zz", the coding is represented by 4? zz zz zz zz;

for instance, if there are five "48 cc 48 cc", the coding is represented by 44 48 cc 48 cc; if there is one "c3 f8 55 13", the coding is represented by 40 c3 f8 55 13; when representing the coding, the number should subtract from 1.

When there is 0x11 to 0xffff number of the data "zz zz zz zz", the coding is 4? zz zz zz zz 5? ??;

for instance, if there is 0x11 data "47 cc 38 fe", the coding is 40 47 cc 38 fe 50 11; if there is 0xab4d number of "47 cc 38 fe", the coding is 4a 47 cc 38 fe 5b 4d.

(5) when independent data is determined, the coding of the independent data is:

([80|zz] zz zz zz) 4 bytes;

when a single data is independent and different from both the previous data and the next data, if the above coding method is adopted, 5 byte is needed, thus the data amount is increased instead. Considering the image is gradually changed most of the time, there is high possibility that the values of high bytes are the same, therefore the independent data is optimizingly processed by the following coding:

when the high bit (bit 31) of data is the same as the high bit (bit 31) of the previous DWord, this coding can be adopted. When encoding, do or operation for $31^{th}$ bit with 1;

for instance, the data 7c 82 55 3f 6e 9f 28 31; the front 4 byte has been processed, and then when there is no other optimized way (e.g. it is the same as the previous frame, or can be combined with the back data), this coding can be used due to the higher 15 bits in the two 4 byte data are both 1;

after coding, the data is 9f 6e 28 31.

In addition, the independent data having different high bit can be represented by (3? zz zz zz zz . . . zz zz zz zz) or (3? zz zz zz zz . . . zz zz zz zz 5? ??; wherein "zz zz zz zz" represents the original data;

for instance, 7c 82 55 3f 6e 1f 28 31 is represented by 3.

(6) when regular variation of two colors is determined, the only two colors in the part or whole frame image are represented by:

the first color is represented by (7? 00) 2 bytes or (7 ? 00 5? ??) 4 bytes;

the second color is represented by (7? 01) 2 bytes or 7? 01 5? ??) 4 bytes;

for instance, the data 7c 82 55 3f 7c 82 55 3f 7c 82 55 3f ae 9f 28 31 ae 9f 28 31 7c 82 55 3f 7c 82 55 3f 7c 82 55 3f ae 9f 28 31; the 4 bytes of the front 5 pixels has been processed, the $6^{th}$, $7^{th}$, $8^{th}$, $9^{th}$ pixel can be processed by using this coding;

after coding, the data is 73 00 71 01.

5. The data desired to be transmitted is packaged, compressed, and then transmitted real-time; the communication protocol can be network protocol, USB, i1394 etc.

6. After the Client receives the data, the corresponding decompression is carried out, and then increment refreshing is carried out in the displaying content and only the changed part is refreshed.

In the above embodiments, the processing may be carried out by using DWord (4 bytes, 32 bits) as the unit; the above embodiments combines the judgment value and the length identifier, the judgment value can be in front of or behind the length identifier; the judgment value and the length identifier can be expressed separately.

What is claimed is:

1. A method of remote displaying and processing based on Server/Client architecture, wherein:
    (1) current desktop signal is used as data source, and an original frame having original image data is extracted from the data source and saved;
    (2) an area in the memory of the Server computer is divided into three blocks, the first block is used for saving original image data, the second block is used for saving a current frame having current image data, and the third block is used for compressing the data to be transmitted after comparison;
    (3) pixel data of the current frame and the original frame is compared one to one from the current frame, and if no data variation occurs, the original image data of the first block remains unchanged, and if data variation occurs, changed data replaces the original frame data in the original frame; then, each two adjacent pixels are carried out data comparison within the original frame and the current frame so as to finish the data acquisition and compression coding;
    (4) all the changed data transmitted to the third block in sequence is compressed, packaged and sent out as compression data; the data transmission between the Server and the Client adopts uninterrupted transmission;
    (5) the Client receives the compression data from the Server, and then decompresses the compression data and transmits the decompression data to the computer memory of the Client; after receiving the decompression data, the Client computer only refreshes and displays the changed data.

2. The method of remote displaying and processing based on Server/Client architecture of claim 1, wherein the data acquisition and compression coding is as follow:
    A. during the comparison, judgment values are added to judge if interframe variation occurs, if the data is black data or white data or non-black or non-white data, if the data is independent changed data, if the variation is a regular change between two colors; the coding compression is carried out according to the above judgment results;
    B. during the comparison, length identifier is used for judging the number of continuous changed value between frames, the number of black or white data, the number of non-black and non-white data, and the number of the two regular colors.

3. The method of remote displaying and processing based on Server/Client architecture of claim 2, wherein the judgment value is in front of or behind the length identifier; the judgment value and the length identifier are expressed separately or in combination.

4. The method of remote displaying and processing based on Server/Client architecture of claim 2, wherein during the data compression, high bit comparison is used for the independent changed data, and if the data is different from the previous pixel and the next pixel, high bit comparison is firstly carried out between the data and the previous pixel one by one or several by several; if the high bits are identical, the high bit is preset, i.e. the high bit is set to 1; as for the independent data with difference in several continuous high bits, additional judgment value and length identifier are added in front of the independent data to represent the continuous independent data with different high bit.

5. The method of remote displaying and processing based on Server/Client architecture of claim 2, wherein when the entire or part of the image is of two colors of data during the data compression, the color data is set to one byte.

\* \* \* \* \*